United States Patent Office 2,708,707
Patented May 17, 1955

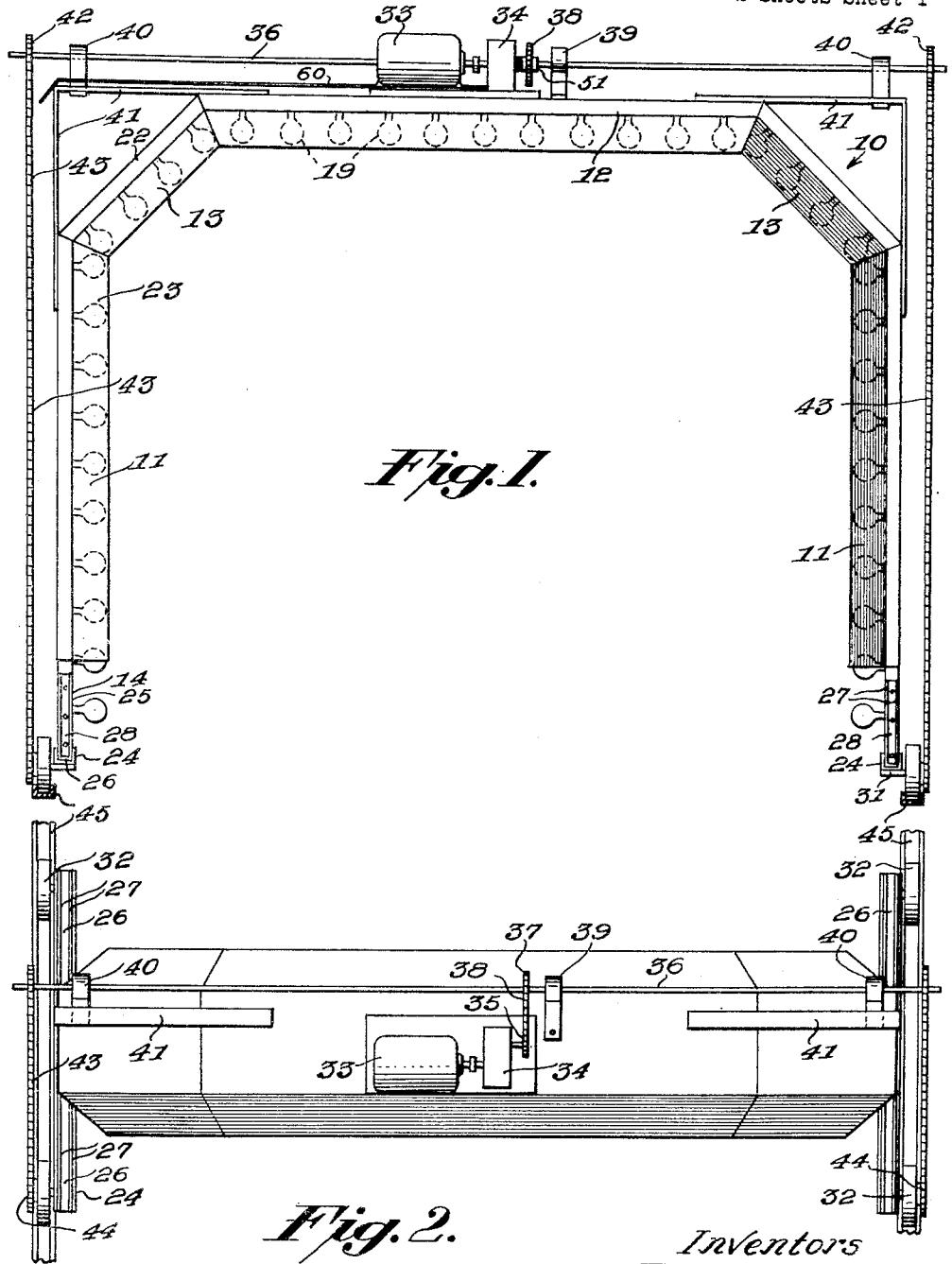

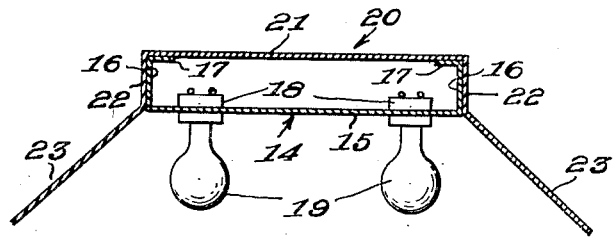
Fig. 3.
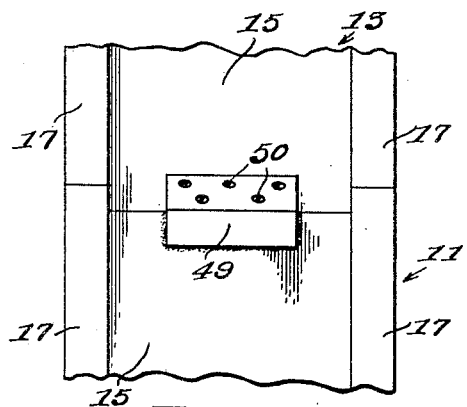
Fig. 5.
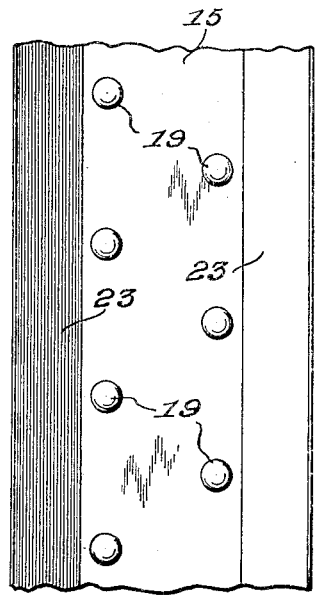
Fig. 4.
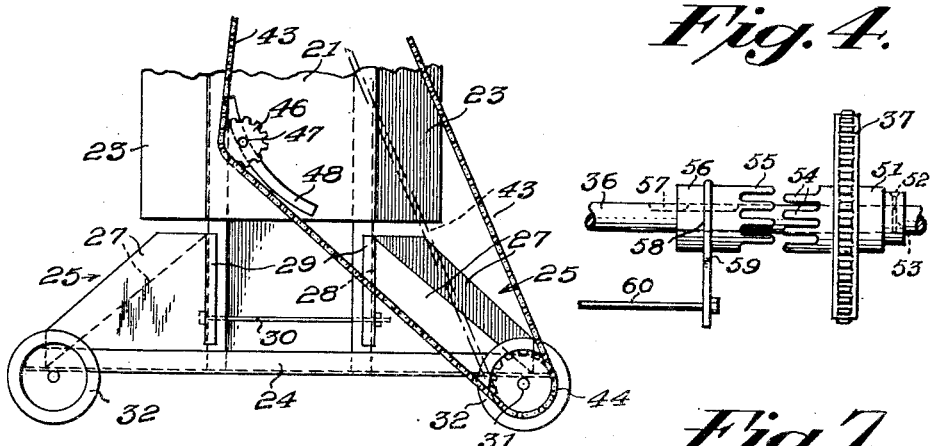
Fig. 6.
Fig. 7.
Inventors,
F. C. Merrill
and C. H. Cobb
by James Arkins
Attorney

2,708,707

PORTABLE PAINT BAKING APPARATUS

Frank C. Merrill and Coleman H. Cobb, Dallas, Tex.

Application June 13, 1952, Serial No. 293,476

2 Claims. (Cl. 219—35)

This invention relates to a portable paint baking apparatus.

The invention is more particularly concerned with a novel apparatus for use in drying freshly painted automobile bodies and the like, wherein the apparatus is designed to travel slowly and uniformly over a painted automobile body and dry the paint thereon by means of light and heat waves induced by infrared lamps with which the apparatus is provided.

Paint drying apparatus of the general character above referred to have been in use for many years, and while such apparatus may have been generally successful, same was nevertheless subject to certain disadvantages and inefficiencies which are overcome by the present invention.

The prior apparatus, in common with that of the present application, comprises an inverted U-shaped or arched frame, the lower ends of whose vertical side members are supported by wheels. The common structure also includes tracks or wells in which the wheels travel whereby the frame, which straddles an automobile body being painted, travels in a straight line.

To properly dry fresh paint on an automobile body, it is of prime importance that the lamp-supporting frame travel back and forth over the automobile body at uniform speed, as otherwise certain painted areas will receive more heat than others with a resulting imperfect drying operation.

For accomplishment of the above requirements, it has been found that if the wheels at opposite sides of the frame are not uniformly driven, the frame will tend to cant and the wheels will bind on the sides of the tracks or wells with a resulting non-uniform motion of the frame or in fact, the complete stopping of same and which, as above stated, is not conducive to a proper paint-drying operation.

The main disadvantage of paint-drying apparatus as heretofore constructed is that power is applied to a wheel at one side only of the frame, and with which construction the wheels at the opposite side of the frame were moved only through the relatively large and heavy frame, and as a result of which the wheels at both sides could not be relied upon to travel in the straight lines of the track, and consequently a binding action between the wheels and tracks was a rather common occurrence and which defeated the intended purpose of a slow, uniformly moving frame as is necessary for proper drying of the paint.

It is accordingly a primary object of the present invention to provide an automobile body paint-drying apparatus of the general character above described and wherein the above noted objections to prior constructions are wholly overcome.

A further object of the invention is to provide an automobile body paint-drying apparatus including an inverted U-shaped or arched lamp-carrying frame having supporting wheels movable in U-tracks and wherein a wheel at each side of the frame is positively driven from a common drive shaft and which shaft in turn is driven by power means supported substantially centrally of the opposite sides of the frame thereby providing a weight-balanced construction.

A still further object of the invention is to provide an automobile body paint-drying apparatus which is capable of vertical adjustment for use with automobiles or trucks.

A still further object of the invention is to provide an automobile body paint-drying apparatus including a relatively light panel-form frame and wherein the panels are readily separable for folding thereof for shipment.

A still further object of the invention is to provide an automobile body paint-drying apparatus including a frame having outwardly disposed channel panels which are apertured for receiving lamps, and heat-reflector panels extending around the frame panels outwardly thereof in the provision of a substantial space for the lamp-wiring and facilitating repair thereof upon removal of the reflector panels.

Other objects and advantages of the invention will become apparent in the course of the following detailed description, taken in connection with the accompanying drawings, wherein Figure 1 is an elevational view of the improved apparatus as viewed in the direction of travel thereof.

Fig. 2 is a top plan view of the apparatus shown in Fig. 1.

Fig. 3 is a transverse sectional view of one of the frame panels and a cooperating reflector panel and showing the mounting of the light and heat-producing lamps therein.

Fig. 4 is a fragmental view of the exterior of a frame panel.

Fig. 5 is a fragmental view at the junction of a vertical frame panel and the adjacent oblique roof-forming frame panel and showing the readily removable connection therebetween.

Fig. 6 is a broken side elevational view showing the frame and drive sprocket adjusting means.

Fig. 7 is a fragmental elevational view on an enlarged scale and showing a clutch structure operatively associated with the drive shaft, which clutch structure is more or less diagrammatically illustrated in Fig. 1 but is omitted in Fig. 2 for greater clarity of disclosure.

Referring now in detail to the drawings, the improved apparatus comprises a frame 10 which, as shown in Fig. 1, is of inverted U-form and which is adapted to straddle a painted automobile body and move back and forth over same at a uniform rate of speed.

The frame 10 comprises outwardly facing channel frame members or panels and inwardly facing channeled and winged reflector members or panels. The inverted U or arched form of the frame includes opposed vertical sections 11, a horizontal top or roof section 12, and a pair of oblique sections 13 interconnecting the upper ends of the vertical sections 11 and the opposite ends of the horizontal section 12.

The sections 11, 12 and 13 are of like construction and each includes (Fig. 3) an inner outwardly facing channeled frame forming a light-supporting member or panel 14.

The panels 14 include a base section 15, opposite side flanges 16 and outer flanges 17 parallel with and substantially spaced from the base section 15.

The base section 15 of each panel 14 is provided with a multiplicity of apertures in which are disposed lamp sockets 18 which are wired in series throughout the arch of the frame, and heating elements preferably in the form of infrared lamps 19 of preferably 250 watt capacity are inserted in the sockets 18. Each section 11, 12 and 13 further includes a light and heat-reflector panel 20 including a base 21 seated upon and removably secured to flanges 17. The reflector panel further includes parallel side portions 22 embracing the flanges 16 and a pair of inwardly diverging reflector wings 23.

The arched frame 10 is of the form shown in Fig. 3 throughout its entire extent except for the lower ends of the side sections 11 wherein the panels 14 extend a substantial distance below the ends of the reflector panels 20.

These extended bottom portions of the panels 14 provide for attachment of the frame-supporting wheels in the following manner.

A relatively long channel bar 24 extending horizontally freely receives the lower ends of the panel 14. A channel member 25 is disposed at each opposite side of panel 14 and has the base 26 thereof disposed within the channel bar and rigidly secured thereto. The member 25 further includes opposed gussets 27 interconnected by a vertical wall 28 slidably engaged with the adjacent flanges 16 of the panel 14, and the gussets 27 are extended as at 29 over the base 15 and flanges 17 of panel 14 and which, with wall 28, provide a channel for slidably receiving the adjacent side of the panel 14.

The flanges 16 and the walls 28 are apertured at vertically spaced points for the reception of a bolt 30 which, when positioned in selected apertures, positions the lower end of the panel 14 at selected distances from channel bar 24 with a resulting variation of the height of the frame. An axle 31 is welded to the bottom of channel bar 24 adjacent each end thereof, and a wheel 32 is rotatably supported on each axle.

The improved drive means for the wheels comprises an electric motor 33 supported on the top section 12. The motor is in driving connection with a speed reduction unit 34 having a sprocket wheel 35. It is to be noted that the motor and speed reduction unit are disposed centrally of the frame.

A drive shaft 36 extends above and parallel with section 12 and has secured thereto intermediate its ends a sprocket 37 operatively connected to sprocket 35 through a sprocket chain 38. The shaft 36 is journalled in an intermediate bearing 39 and opposite end bearings 40 which latter are supported on straps 41.

The shaft 36 at each end thereof rigidly supports a sprocket wheel 42, and a sprocket chain 43 extends around each sprocket wheel 42 and a sprocket wheel 44 on oppositely alined wheels 32 at corresponding ends of the channel bars 24.

With this construction, opposite axially alined wheels 32 are driven at uniform speed with the result that no binding will occur between the wheels and the side walls of the channel tracks 45 in which the wheels travel.

In accordance with the present invention, means are provided whereby upon continued operation of the motor 33 the drive shaft 36 is intermittently operated under control of an operator. Such means, in a preferred embodiment thereof, is illustrated in Fig. 7, and includes a clutch member 51 extending through and secured to the sprocket 37 and which is provided with a central bore in which the drive shaft 36 is freely rotatable.

In order to maintain the clutch member 51 and sprocket 37 in a fixed position axially of the shaft, a set screw 52 extends into the member 51 and has its inner end disposed within a circumferential groove 53 in the drive shaft 36.

The clutch member 51 is provided with axially extending teeth 54 which are operatively engageable with similar teeth 55 on a second clutch member 56 which is axially slidable on the drive shaft 36 but restrained against rotation thereon by a key 57.

The clutch member 56 is provided with a circumferential groove 58 in which freely rides a shift collar 59.

An operating rod 60 has one end thereof suitably secured to the collar, and such rod overlies the roof section 12 and is accessible at one side of the frame, as is indicated in Fig. 1.

As shown in Fig. 7, the clutch structure is disengaged and in which position the sprocket 37 will freely rotate on shaft 36 when the motor 33 is in operation. When it is desired to impart rotation to the shaft for movement of the frame, the rod 60 is moved to the right in Fig. 7, with a resulting interengagement of the clutch member teeth 54 and 55, whereupon the rotating sprocket 37 will impart rotation to the clutch member 56, and since such member is keyed to the shaft, rotation will be imparted thereto.

In order to adjust the sprocket chains 43 upon varying the elevation of the frame in the manner shown in Fig. 6, a sprocket wheel 46 is rotatably supported on a shaft 47 which is adjustably supported in an arcuate slot in base 21 of panel 20 and one run of the chain may extend around such sprocket wheel upon elevation of the frame. The said one run of the sprocket chain may be as indicated in dot-and-dash lines in Fig. 6 when the frame is in its lowermost position.

In order to provide for compact packing and storing of the frame the lamp-bearing sections may be connected as in Fig. 5 wherein a plate 49 is welded to one section and is detachably secured to the adjacent section by screws 50. The reflector sections are co-extensive with the lamp-bearing sections and are removably secured to the flanges 17 thereof. Furthermore, the material of the frame is preferably 14-gauge black iron which has a high heat reflecting capacity.

Having set forth the invention in accordance with a preferred structural embodiment thereof, what is claimed and sought to be secured by U. S. Letters Patent is:

1. A paint drying apparatus comprising a vertically disposed frame of generally inverted U-form, said frame including a top horizontal section and opposed vertical side sections, a series of heating elements supported by the said top and side sections and projecting inwardly of the frame, said heating elements being disposed in substantially uniformly spaced relation from one end of the series thereof to the other end, a pair of surface engageable wheels rotatably supported by the frame at the lower end of each side section, power means supported by the top section intermediate the opposite ends thereof, drive means extending from said power means and being operatively connected to one wheel of each of said pairs thereof, and each of said sections comprising an outwardly facing channel member in the base of which respective ones of said heating elements are supported, an inwardly facing channel member whose base closes the said first channel member, the side walls of said inwardly facing channel member embracing the side walls of the outwardly facing channel member, and inwardly directed diverging heat reflector wings projecting from the said side walls of the inwardly facing channel member.

2. A paint drying apparatus comprising a vertically disposed frame of generally inverted U-form, said frame including a top horizontal section and opposed vertical side sections, a series of heating elements supported by the said top and side sections and projecting inwardly of the frame, said heating elements being disposed in substantially uniformly spaced relation from one end of the series thereof to the other end, a pair of surface engageable wheels rotatably supported by the frame at the lower end of each side section, power means supported by the top section intermediate the opposite ends thereof, drive means extending from said power means and being operatively connected to one wheel of each of said pairs thereof, a relatively long horizontally disposed channel bar disposed at the lower end of each side section to the opposite ends of which the wheels of a respective pair thereof are rotatably supported, said channel bar freely receiving the lower end of the side section, a member rigidly supported by said bar at each of the opposite sides of the side section, said members including vertical channel portions facing each other and in which opposite side portions of the side section are vertically slidably disposed, alignable apertures in the bases of said vertical channel portions and adjacent walls of said side section, and a bolt extendable through selected aligned apertures for vertical adjustment of the frame relative to the supporting wheels.

References Cited in the file of this patent

UNITED STATES PATENTS

| | | |
|---|---|---|
| 1,831,152 | Weisker | Nov. 10, 1931 |
| 1,950,033 | Morrison | Mar. 6, 1934 |
| 2,057,776 | Groven | Oct. 20, 1936 |
| 2,260,495 | Tutwiler | Oct. 28, 1941 |
| 2,419,643 | Hudson | Apr. 29, 1947 |
| 2,472,293 | Groven | June 7, 1949 |
| 2,504,516 | Goodell | Apr. 18, 1950 |
| 2,521,232 | Lashells | Sept. 5, 1950 |

OTHER REFERENCES

Industrial Applications of Infra-Red by J. D. Hall, McGraw-Hill Book Co., Inc., 1947, 1st edition, page 159.